United States Patent Office.

JOHN J. BARRETT, OF CHILLICOTHE, OHIO.

Letters Patent No. 82,675, dated October 6, 1868.

IMPROVED AXLE-GREASE.

*The Schedule referred to in these Letters Patent and making part of the same.*

TO ALL WHOM IT MAY CONCERN:

Be it known that I, JOHN J. BARRETT, of Chillicothe, in the county of Ross, and State of Ohio, have invented a new and improved Axle-Grease; and I do hereby declare the following to be a full, clear, and exact description thereof.

The subject of my invention is a compound of saponified rosin, wheat-flour, middlings, and crude petroleum, petroleum-tar, or any suitable animal or vegetable fat, mingled in substantially the manner hereinafter described.

For winter-use, the saponified rosin, middlings, and petroleum may be mixed in about equal parts by measurement. For summer-use, I prefer to employ about one-half the proportionate quantity of petroleum.

In compounding my axle-grease, I first boil the rosin in a caustic solution of soda-ash, at a strength of from fifteen to twenty-five per cent., and in sufficient quantity to completely saponify the rosin, and leave an excess of alkali. This result will be effected by the use of two parts by measurement of alkaline solution, at fifteen per cent., to one part of rosin. After boiling one hour, it is allowed to settle, and may then be tested with the tongue, to ascertain that the saponification is complete, and that an excess of alkali exists. The saponified rosin is then mixed with the flour-middlings and fatty matter, both of which are acted on by the free alkali, and the whole constitutes a homogeneous pasty mass, very well adapted for greasing the axles of wagons or other vehicles.

Having thus described my invention, what I claim, and desire to secure by Letters Patent, is—

The axle-grease, compounded substantially as above described.

JOHN J. BARRETT.

Witnesses:
WM. H. BRERETON, Jr.,
WM. B. DEMING.